3,022,194
COATING COMPOSITIONS AND METHOD FOR APPLYING SAME
Walter K. Vollmer, North Plainfield, N.J., assignor to Union Carbide Corporation, a corporation of New York
No Drawing. Filed Mar. 7, 1960, Ser. No. 12,934
13 Claims. (Cl. 117—75)

The present invention relates in general to coating compositions, and more particularly to polyethylene primer coatings for metallic and metal-like substrate surfaces. The invention also relates to a novel process for applying the coatings of this invention.

The generally poor adhesion of normally solid polyethylene to nonporous, smooth-surfaced substrates is well known. In order to improve the bonding of polyethylene to such substrates, it has heretofore been proposed to apply a thin coating of highly oxidized polyethylene to the substrate, and thereafter apply a further coating of unoxidized polyethylene thereto. The procedure is based on the finding that oxidized polyethylene exhibits a greater adhesive affinity toward both the substrate, particularly metals, and the polyethylene than does polyethylene for the substrate.

A certain degree of improvement, in part offset by degradation of the polymer, is also achieved by applying polyethylene to the substrate at the maximum permissible temperature, i.e., about 300° C. Oxidation of the polyethylene at these high temperatures undoubtedly contributes to the improved adhesion.

It would frequently be desirable, however, to be able to employ polyethylene as a coating material in its unoxidized form in applications where the properties of the unmodified polymer are essential.

It is therefore the general object of the present invention to provide a novel primer coating which when applied to a metallic or other nonporous substrate vastly improves the adhesion of normally-solid polyethylene thereto.

It is another object to provide a method for applying polyethylene to a substrate which does not subject the polymer to such rigorous oxidation conditions as heretofore were necessarily employed.

It is a further object to provide a method whereby a bond of high mechanical strength is attained between polyethylene and a metal substrate.

These and other objects which will be obvious from the specification are accomplished in accordance with the present invention by applying to the substrate a composition consisting essentially of normally solid polyethylene dissolved in an inert organic solvent therefor, and a copper soap, and thereafter heating the substrate and applied composition to remove the inert organic solvent and increase the adhesion between the substrate and the coating.

A simplified flow diagram of one embodiment of the method is as follows:

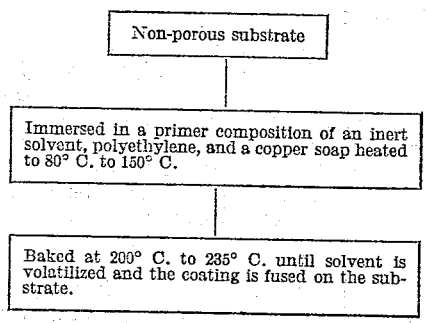

In the preparation of the primer composition any of the normally solid ethylene homopolymers have been found to be suitable. These include both the so-called high pressure and low pressure polyethylenes regardless of the particular polymerization catalyst employed in producing the polymer from ethylene. A comprehensive treatment of the various processes by which polyethylene suitable for use in this invention can be prepared appears in chaper III, Polyethylene, by R. A. V. Raff and J. B. Allison, Interscience Publishers, New York, New York (1956).

Among the inert organic solvents which can be used to form the polyethylene solution are benzene; toluene; xylene; amylacetate; trichloroethylene; tetrachloroethylene; 1,2-dichloroethane; tetrachloroethane; hexachlorobutadiene; trichlorocumene; hexachloropropane; carbon tetrachloride; n-heptane; methylcyclohexane; turpentine; Tetralin; Decaline; petroleum ether; solvent naphtha; and the like. The foregoing list is provided for purposes of illustration and is not intended to be limitative thereof, since numerous and varied solvents for polyethylene are well known in the art.

The third essential ingredient of the present primer composition is a copper soap, which I have found to exhibit highly unexpected properties in the system here concerned. Whereas copper soaps are frequently categorized along with soaps of such similar metals as cobalt, manganese, iron and lead, as "metal driers" in paints, wrinkle-finish resin coatings and the like, I have found the copper soaps used in the present compositions behave in an entirely anomalous manner, to the end that oxidation of the polyethylene present is inhibited rather than promoted. The copper soaps displaying this anomalous behavior and being therefore suitably employed in the composition of the present invention are for the most part included within the art-recognized categories termed copper resinates, copper linoleates, and copper naphthenates.

The copper resinates are the copper salts of those organic carboxylic acids which are present either in free or combined form in a natural resin, and particularly the copper salts of common natural rosin acids. The predominant acid in natural rosin is abietic acid which is present largely in free form. The copper linoleates are generally considered to include not only copper linoleate, but also the copper salts of any of the fatty acids derived from linseed oil, such as linolenic and oleic acid. The copper naphthenates constitute the group of copper salts of naphthenic acids. These acids comprise the generic group of free acids naturally occurring in naphthene base crude petroleums and which consist of cyclic compounds having aliphatic side chains of varying length and complexity. For reasons of cost, better solubility, more uniform availability of the copper in combined form, and greater stability, the copper naphthenates are the preferred copper soaps in this invention.

Thus, throughout the specification and in the claims, the term "copper soap" is intended to mean any of the conventional organic acid salts of copper in which the metal is present only as the cation, but preferably the copper salts of acids containing at least 8 carbon atoms. Specific illustrative members are copper oleate, copper linoleate, copper octoate, copper abietate, copper sorbate, copper geranate, copper humocerate, copper palmitolate, copper eicosinate, copper ricinoleate, copper quinolinolate, and copper naphthenate.

The primer compositions are readily prepared by heating a mixture of polyethylene and the inert organic solvent until a clear solution is attained. Because of the relatively low solubility of normally solid polyethylene in even the most effective solvents at normal temperatures, the inert organic solvent is advantageously heated at a temperature of from about 75° C. to about 150° C., preferably from about 95° C. to 115° C., to facilitate the dissolution of the polyethylene. The relative proportion of polyethylene to solvent is not at all critical, and in fact will vary depending upon such factors as the temperature of the solution, the molecular weight of the polyethylene, and the nature of the solvent. In general, a weight proportion of solvent to polyethylene of from 5:1 to about 19:1 is entirely suitable, but can, of course, be varied widely according to the desire of the practitioner.

The proportion of copper soap relative to the polyethylene must, however, be more closely limited. Since the soaps are most commonly mixtures of copper salts of several organic acids, as for instance copper naphthenate, the concentration of copper soap is advantageously expressed in terms of the copper in the free state. I have found that amounts of copper soap sufficient to impart from about 0.02 to about 0.3 percent by weight metallic copper based on the weight of the polyethylene present are suitable in the present primer compositions. Preferably, from about .038 percent to about .152 percent by weight copper in the form of a copper soap is employed.

The copper soap can be added to the other two essential ingredients of the primer composition, i.e., solvent and polyethylene, at any time but advantageously is added to the hot solution of polyethylene just prior to application of the composition to the substrate.

The substrate can be any metal or metal-like surface such as copper, aluminum, tinplate, steel, silver, tungsten, chromium, nickel, or alloys containing these or other metals such as bronze, constantan, German silver, Nichrome and the like. It has been found that coatings exhibiting markedly improved adhesion to glass surfaces are achieved by the present invention, especially after a short aging period.

The method of applying the primer composition to the substrate is not critical and can be accomplished by dipping the substrate in the primer composition, by spraying the primer onto the substrate, or in any other desired manner. It is necessary, however, that the primer composition be applied at an elevated temperature of from about 80° C. to about 150° C., preferably at about 95° C. to about 115° C.

Firm adhesion of the primer coating to the substrate is achieved by baking the newly applied coating at a temperature in the range of from about 200° C. to about 235° C. for a period of time sufficient to volatilize the solvent from the polyethylene and copper soap constituents and fuse the coating. The baking can conveniently be accomplished in air and is in general sustained for a period of about 15 minutes at 200° C. to about 2 minutes at 235° C. I have found that over-baking tends to reduce the adhesion and should be avoided. It will of course be readily appreciated by those skilled in the art that the most advantageous correlation of time and temperature is dependent in part upon the particular solvent employed, the average molecular weight of the polyethylene, and the thickness of the primer coating. Such factors are easily dealt with, however, with a minimum amount of routine experimentation to achieve optimum results. A coating thickness of from about 0.0001 to about 0.001 inch has been found to be quite satisfactory although coatings of greater or lesser thickness can of course be used.

Unmodified polyethylene can be applied over the primed substrate by any suitable conventional technique such as by compression molding, extruding, or spraying heat softened polyethylene onto the primed surface of the article concerned, or by lamination.

The polyethylene coated articles advantageously prepared according to the process of the present invention and using the primer coatings as described are useful in applications where the corrosion resistance and/or the electrical insulation provided by the polyethylene coating are important. For example, polyethylene coated metal foil can be readily used in the production of electrical circuits, electronic components, and particularly electrical condensers.

The following examples are given to illustrate the compositions and method of the present invention, but are not to be construed as limiting.

Example I

A primer composition was prepared by dissolving 50 grams of a polyethylene homopolymer (having an average molecular weight of about 21,000, a melt index of 1.5 and a density at 25° C. of 0.918) in about 450 grams of an aromatic petroleum hydrocarbon solvent (having a boiling point range of 324–342° F.). A clear solution was attained at 110° C. To this solution was added 0.63 gram of copper naphthenate soap containing about 6 percent copper by weight, thereby producing a primer composition containing theoretically .076 percent by weight metallic copper based on the weight of the polyethylene present. This primer composition was applied to an aluminum, tinplate, steel, and copper substrate by dipping 1" x 6" panels of these respective materials into the solution at 110° C. so that half of the surface of each was coated, and subsequently baking the panels at 204° C. for 10 minutes. Over the entire surface of each panel a 4 mil film of a standard polyethylene extrusion composition (consisting of low density (0.918 g./cc.) polyethylene having a melt index of 1.5 and 0.02 percent by weight dibutyl paratertiary cresol stabilizer) was laminated under pressure at 135° C. After cooling, the adhesion of the laminate was tested by slicing through the film to the metal substrate and peeling. In all instances, the laminated film exhibited no adhesion to the unprimed portion of the panel. In all instances the adhesion to the primed portion of the panel was good. A control panel of each of the metals employed above was subjected to the identical procedure with the single exception that the copper naphthenate was omitted from the primer formulation. Adhesion of the laminate over the primed area of the control panels was no better than over the unprimed areas, with the possible exception of the copper substrate.

Example II

The procedure and formulations of Example I were repeated except that copper ricinoleate was employed instead of copper naphthenate. The results were substantially the same as reported in Example I.

Example III

The procedure and formulations of Example I were repeated except that copper oleate was employed instead of copper naphthenate. The results were substantially the same as reported in Example I.

Example IV

The procedure and formulations of Example I were repeated except that the polyethylene utilized in the primer coating and as the laminate had a melt index of 6–7 and a density of 0.96 gm./cc. at 25° C. The adhesion of the laminate to the primed surface of each of the metal panels was exceptionally good and required about 2500 grams/inch width of laminate to peel the coating from the substrate.

Example V (a) Using the primer coatings stripped from the panels as prepared in Example I, both the primer coatings on the control panels containing no copper soap, and the primer coatings containing the copper naphthenate of the present invention were subjected to infrared analysis to determine the severity of oxidation of the polyethylene as indicated by carbonyl absorbance at 5.7–5.8 microns. In the primer coatings containing the copper naphthenate according to the present invention very little absorbance in this wave length was found. However, the primer coating containing no copper soap was found to show a deep carbonyl absorbance indicating severe oxidation of the polyethylene.

(b) The results obtained in part (a) were verified by chemical analysis for peroxide content of the respective polyethylene films. The analysis indicated that the peroxide content of the polyethylene in the primer coatings containing copper naphthenate was 0.356 milligram per 1.0 gram polyethylene. The polyethylene of the primer coatings containing no copper soap contained 0.850 milligram peroxide per 1.0 gram polyethylene.

The primer compositions of this invention can contain conventional stabilizers, anti-static compounds, colorants, slip agents, and like conventional additives in small amounts without substantially altering the fundamental properties of the primer compositions. Minor proportions, with respect to copper soaps, of other metal soaps can be present, but do not impart the improved adhesiveness to the primer coatings as the copper soaps of the present invention. Therefore, by stating that the compositions of the invention consist essentially of a copper soap, polyethylene, and an inert solvent for the polyethylene, I do not intend that other ingredients which do not alter the novel and fundamental properties of the compositions be excluded.

What is claimed is:

1. A primer coating composition for applying to a nonporous substrate surface which consists essentially of a normally solid polyethylene dissolved in an inert organic solvent therefor, and a copper soap, said copper soap being a copper salt of a carboxylic acid containing at least 8 carbon atoms and being present in an amount sufficient to impart to the composition from about 0.02 to about 0.3 percent by weight copper based on the weight of polyethylene present.

2. The composition of claim 1 wherein the weight proportion of solvent to polyethylene is from about 5:1 to about 19:1.

3. The composition of claim 2 wherein the copper soap is a copper naphthenate and is present in an amount sufficient to impart to the composition from about 0.038 to about 0.152 percent by weight copper based on the weight of polyethylene present.

4. The method of preparing a metallic surface for subsequent application thereto of a coating of polyethylene which includes the steps of applying to said metallic surface at a temperature of between about 80° C. and 150° C. a primer coating composition consisting essentially of a normally solid polyethylene dissolved in an inert organic solvent therefor and a copper soap, said copper soap being a copper salt of a carboxylic acid containing at least 8 carbon atoms and being present in an amount sufficient to impart to the composition from about 0.02 to about 0.3 percent by weight copper based on the weight of polyethylene present, and thereafter baking said coating on said surface at a temperature between about 200° C. and 235° C. to volatilize the solvent and attain a strongly adhering primer coating on said surface.

5. The method according to claim 4 wherein the primer coating composition is applied to the substrate surface at a temperature of between 95° C. to 115° C.

6. The method of coating a metallic surface with polyethylene which includes the steps of applying to said metallic surface at a temperature between about 80° C. and 150° C. a primer coating composition consisting essentially of a normally solid polyethylene dissolved in an inert organic solvent therefor, and a copper soap, said copper soap being a copper salt of a carboxylic acid containing at least 8 carbon atoms, and said copper soap being present in an amount sufficient to impart to the composition from about 0.038 percent to about 0.152 percent by weight copper based on the weight of the polyethylene present, baking said coating on said surface at a temperature between about 200° C. and 235° C. to volatilize the solvent and obtain good adhesion of the primer coating on said surface, and thereafter applying a coating of polyethylene to said primer coating.

7. The method according to claim 6 wherein the copper soap is copper naphthenate.

8. The method according to claim 6 wherein the metallic surface is copper.

9. The method according to claim 6 wherein the metallic surface is aluminum.

10. The method according to claim 6 wherein the metallic surface is steel.

11. The method according to claim 6 wherein the metallic surface is tinplate.

12. The method according to claim 6 wherein the copper soap is copper resinate.

13. The method according to claim 6 wherein the copper soap is copper linoleate.

References Cited in the file of this patent

UNITED STATES PATENTS

| | | |
|---|---|---|
| 2,448,799 | Happoldt et al. | Sept. 7, 1948 |
| 2,462,331 | Myers | Feb. 22, 1949 |
| 2,790,734 | Kuhn et al. | Apr. 30, 1957 |
| 2,907,671 | Davevier | Oct. 6, 1959 |
| 2,910,384 | Toulmin | Oct. 27, 1959 |
| 2,955,958 | Brown | Oct. 11, 1960 |